United States Patent

Mostrom

[11] Patent Number: 6,107,694
[45] Date of Patent: Aug. 22, 2000

[54] BAFFLER—MODEL A —AN AUTOMOBILE ANTI-THEFT DEVICE

[76] Inventor: Lloyd C. Mostrom, 910 N. Montana St., Arlington, Va. 22205-1622

[21] Appl. No.: 08/955,922

[22] Filed: Oct. 22, 1997

Related U.S. Application Data

[60] Provisional application No. 60/035,400, Dec. 12, 1996.

[51] Int. Cl.[7] .................................................. B60R 25/00
[52] U.S. Cl. ............................ 307/10.2; 180/287; 70/252
[58] Field of Search .......................... 307/9.1, 10.1–10.4, 307/10.6; 180/287; 70/237, 252, 255, 256, 257, 275, 277, 278, 280, 222, 223; 74/552; 280/771

[56] References Cited

U.S. PATENT DOCUMENTS

| | | | |
|---|---|---|---|
| 1,437,480 | 12/1922 | Vandelip | 70/223 |
| 3,566,634 | 3/1971 | Borck | 70/252 |
| 4,811,580 | 3/1989 | Jang | 180/287 |
| 5,437,350 | 8/1995 | Sallez et al. | 180/287 |
| 5,921,355 | 7/1999 | Mostrom | 188/77 W |
| 6,034,442 | 3/2000 | Mostrom | 307/10.2 |

Primary Examiner—Fritz Fleming

[57] ABSTRACT

The Baffler is a small and simple assembly of modified common use components hidden within the steering column enclosure. Said components are attached to the upper and lower sections of a cut automobile steering rod and controlled by a mechanical linkage powered by a bi-directional electric motor controlled by a contact on the ignition key core. Said bi-directional electric motor powers said components to interlock to provide normal steering control of the automobile or converesly to seperate said components to provide free turning of said steering wheel without any correcponding effect on the lower section of the steering assembly.

1 Claim, 1 Drawing Sheet

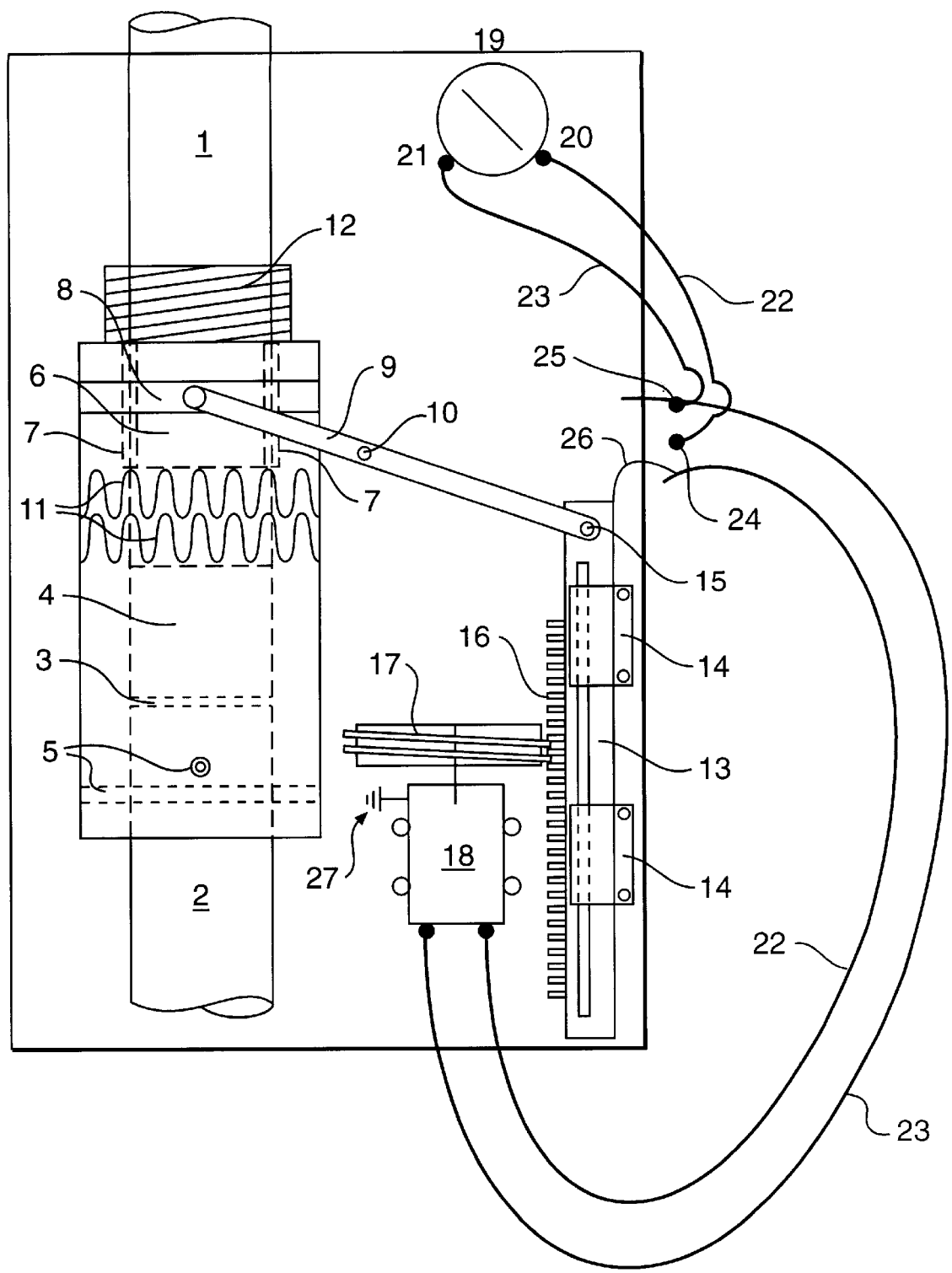

BAFFLER— MODEL A — AN AUTOMOBILE ANTI-THEFT DEVICE

CROSS REFERENCE TO RELATED APPLICATION

Provisional application No. 60/035,400 submitted Dec. 12, 1996

Patent application Frustrator—MODEL C Ser. No. 08/883,595 submitted Jun. 6, 1997, now U.S. Pat. No. 5,921,355

Patent application Frustrator—Model E Ser. No. 08/911,266 submitted Aug. 14, 1997, now U.S. Pat. No. 6,034,442.

SUMMARY OF THE INVENTION

The Baffler is a simple assembly of components, each of which has been proven in common everyday use in various contexts. Inventability lies in the arrangement, coordination and control of these components to achieve the desired results. Control of this assembly lies in the normal operation of the ignition key to stop the automobile engine or to start the automobile engine prior to operation of the vehicle. When the ignition key is turned to the "off" position to stop the automobile engine, the assembly bi-directional electric motor will be energized to move the linkage and the upper steering rod sleeve on the cut steering rod to be disengaged from the mated lower steering rod sleeve and the automobile will be impossible to steer even if the ignition wiring is bypassed to start the automobile engine. Conversely, when the ignition key is turned to the "on" position to start the automobile engine, the assembly electric motor will be energized to move the linkage and the upper steering rod sleeve to engage the mated lower steering rod sleeve to provide a solid steering rod connection for normal steering. A compressed safety spring is positioned above the upper sleeve to drive said upper sleeve forward to engage the lower sleeve in case of an unlikely failure of the linkage which would normally restrain said safety spring.

STATEMENT REGARDING FEDERALLY SPONSORED RESEARCH

Not Applicable

REFERENCE TO MICROFICHE APPENDIX

Not Applicable

BACKGROUND OF INVENTION

This device is in the utility field and is in response to a growing frequency of automobile thefts and is designed to frustrate would-be automobile thieves who do not have use of the automobile ignition key. There are on file patent applications that would disconnect the steering mechanism, but none has been found that is as simple as this proposal and all devices known differ in major respects from submission Ser. No. 08/955,922.

BRIEF SUMMARY OF THE INVENTION

This invention provides automatic non-functioning of the automobile steering mechanism when the ignition key is turned to the "off" position in the normal routine of stopping the automobile engine. When the ignition key is turned to the "on" position in the normal routine of starting the automobile engine, the assembly mounted on the steering rod automatically engages the interlocking sleeves and the automobile steers normally. Breaker switches are positioned to shut off the energizing current when assembly parts reach pre-determined positions. Being located entirely within the steering column enclosure, this assembly will not be observable in a casual inspection of the automobile interior, and the assembly will be tamper-proof without dismantling the steering column enclosure.

BRIEF DESCRIPTION OF THE SEVERAL VIEWS OF THE DRAWING

The main FIGURE of the drawing shows the two notched interlocking sleeves (4 & 6) riding on two segments (1 & 2) of the steering rod in a non-engaged position with the ignition in the "off" position. The upper sleeve (6) is movable fore and aft riding on metal splines (7) mating with metal grooves in both the upper sleeve (6) and the upper segment of said steering rod (1), thus anchoring this sleeve to the upper segment of said steering rod (1) for rotary motion while rendering said sleeve (6) free to move fore and aft as controlled by lever (9). Said upper sleeve (6) contains a circular groove (8) mating with a knob on lever (9) anchored with fulcrum pin (10) and attached at the other end to threaded shaft (13) by pin (15) to control the fore and aft movement of said sleeve to engage or disengage the notches of lower sleeve (4). Said lower sleeve (4) is firmly anchored to the lower segment of the steering rod (2) by rivets (5). The associated parts of the drawing shows the bi-directional electric motor (18) with its attached worm gear wheel (17) which engages threaded shaft (13) which engages lever (9) with pin (15). Pin (10) provides the fulcrum for lever (9). Attached to the aft end of said threaded rod (13) is a prong (26) which opens breaker switches (24 & 25) at predetermined positions. Also shown in the drawing is the ignition key core (19) with the ignition key in the "off" position wherein the electric current flows through electric conductor (22) until shut off by breaker switch (24). Electric conductor (23) would carry the current when the ignition key is turned to the "on" position to energize said electric motor (18) and drive the linkage to engage the notches of the upper sleeve (6) with the notches of said lower sleeve (4) until the electric current is shut off by breaker switch (25) at which time sleeves (4 & 6) will be fully engaged and the automobile will steer normally. Safety spring (12) provides added assurance of safe engagement of sleeves (4 & 6) in case of any linkage failure.. The attached Index of Drawing identifies each component of the drawing.

BRIEF DESCRIPTION OF THE INVENTION

The Baffler is a simple assembly located within the steering column enclosure using two notched mated sleeves mounted on the two segments of a steering rod which has been cut into an upper segment and a lower segment. A lower sleeve is firmly attached to the lower segment of the steering rod and extends upward to cradle the lower end of the upper end of said steering rod. The upper sleeve is attached to the upper segment of said steering rod with longitudinal metal splines which permit fore and aft motion while locking in rotational motion relative to said upper segment of said steering rod. A mechanical lever linkage between the upper movable sleeve and a bi-directional electric motor energized by contacts made by turning of the ignition key core moves the upper sleeve to fully engage the lower sleeve when the ignition key is turned to the "on" position to start the automobile engine and assure normal steering of the automobile, and to disengage said sleeves when the ignition key is turned to the "off" position to stop the automobile engine and thus eliminate any steering control.

DETAILED DESCRIPTION OF THE INVENTION

The Baffler is a simple assembly of components located within the steering column enclosure, identified by the index of drawing d consists of the following components:

a. An encompassing frame firmly attached to the steering column and enclosing the several components;

b. A steering rod cut into two parts, the upper segment (1) and a lower segment (2);

c. Two interlocking sleeves (4 & 6) fitted unto the lower and upper segments of said steering rod;

d. A lower sleeve (4) firmly anchored to the lower segment of the steering rod (2) by rivet (5) and cradling the lower end of the upper segment of the steering rod (1);

e. an upper sleeve (6) fitted on the upper segment of said steering rod (1) with metal splines which permit said upper sleeve to move fore to engage the mated notches of the lower sleeve (4) and aft to be free of said lower sleeve (4) notches but restrained to move with said upper segment (1) of said steering rod in any rotational motion;

f. A lever (9) anchored in a fulcrum (10) and fitted with a knob which fits into a circular groove (8) in the outer surface of said upper sleeve (6) to move said sleeve (6) fore and aft, or alternately, the lever claw may be replaced with a simple claw cradle firmly attached to the upper end of threaded shaft (13) to move the upper sleeve (6) fore and aft for engagement or disengagement with the lower sleeve (4);

g. A threaded shaft (13) attached to attached to the other end of said lever (9) by rivet (15) and fitted with side flanges, mating with grooves in side supports (14) anchored in said basic frame, and which permit forward and aft mpvement of said shaft (13) while restraining said shaft from rotational movement;

h. A bi-directional electric motor (18);

i. A worm gear (17) attached to the axis of said electric motor (18) and engaging threaded shaft (13) to move said threaded shaft (13), said lever (9) and said upper steering rod sleeve (6) fore and aft to engage or disengage said lower steering of sleeve (4);

j. A pair of electric wire conductors (22 & 23) which connect said bi-directional electric motor (18) with contacts (20 & 21) on the ignition key core cover to energize said bi-directional electric motor to turn in one direction or in the opposite direction;

k. an electrical contact on the ignition key core which energizes contact point (20) when the ignition key is in the "off" position and energizes contact point (21) when the ignition key is in the "on" position;

l. A pair of breaker switches (24 & 25) in wires (22 & 23) to interrupt the flow of electric current when said threaded shaft reaches predetermined positions;

m. A prong (26) attached to the aft end of threaded shaft (13) will open breaker switch (24) in conductor (22) when threaded shaft (13) reaches a predetermined point while the ignition key is in the "off" position; likewise prong (26) will open breaker switch (25) in line (23) when threaded shaft (13) reaches a predetermined point while the ignition key is in the "on" position;

n. A compressed safety spring (12) positioned on the upper steering rod segment (1) to make sure that if an unlikely failure occurs in the mechanical linkage (9), the upper sleeve (6) will be driven to engage the lower sleeve (4) notches to assure safe steering control of the automobile;

o. A third electric wire (27) attached to the electric motor (18) is a ground;

p. Operationally, the assembly is controlled by turning the ignition key in the normal routine of turning the ignition key to start the automobile engine or to stop the engine. An energized electrical contact on the ignition key core will energize contact point (21) on the ignition key core cover and electrical wire (23) when the ignition key is turned to start the automobile engine and will energize contact (20) and electrical wire (22) when the ignition key is turned to stop the automobile engine. Basically, the steering rod is cut into an upper segment (1) and a lower segment (2). This cut is bridged by an upper sleeve (6) and a lower sleeve (4) which are locked together by interlocking mating notches when the upper sleeve (6) is moved forward or separated for no contact when the upper sleeve (6) is moved aft. The lower sleeve (4) is firmly anchored to the lower segment of the steering rod (2) with rivets (5) and extends upwards to cradle the lower end of the upper steering rod segment (1). The upper sleeve (6) is anchored to the upper segment of the steering rod (1) with longitudinal splines (7) which permit fore and aft motion but lock in any rotational motion. Thus, when the upper sleeve (6) is moved forward, the mating cogs of the two sleeves (4 & 6) will interlock to provide normal steering of the automobile and when the upper sleeve (6) is moved aft there will be no interlocking and no steering capability. The upper sleeve (6) is fitted with a rotational groove (8) in which a lever (9) claw is fitted to control the movement fore and aft of the upper sleeve. The lever (9) in turn is anchored in a fulcrum (10) attached to the basic frame and attached to a threaded shaft (13) which has side cogs (16) mating with the rotational cogs of a worm gear (17) driven by a bi-directional electric motor (18). Alternately, the lever claw (9) may be replaced with a simple claw cradle firmly attached to the upper end of the threaded shaft (13) to move the upper sleeve (6) fore and aft for engagement or disengagement of the lower sleeve (4). The threaded shaft (13) carries side ridges (16) which ride in mated grooves in guide brackets anchored to the basic frame. The bi-directional motor (18) is also anchored to the basic frame and on the motor axis is mounted the worm gear (17) which drives the threaded bolt (13) fore and aft which in turn will move the upper sleeve (6) fore and aft to engage or disengage the steering gear coupling (4 & 6). In turn, the electric motor (18) is energized by electric circuits (22 & 23) controlled by turning the ignition key (19). When the ignition key is turmed to the "off" position, contact (20) and conductor (22) will be energized and the motor (18) will turn to drive the threaded bar (13) forward which will move the lever to move the upper sleeve (6) aft to disengage the sleeves (4 & 6) on the steering rod segments (1 & 2) and there will be no steering control. At a pre-determined position the prong (26) on the threaded shaft (13) will open breaker switch (24) to stop further electric motor action. Converesly, when the ignition key is turned to the "on" position circuit (21 & 23) will energize the motor (18) to turn in the opposite direction to drive the threaded shaft (13) aft to move the lever (9) and the upper sleeve (6) forward to engage the lower sleeve (4) to provide normal steering control. Again the prong (26) on the threaded bar 13) will engage breaker switch (25) at a predetermined position to stop further movement. A compression safety spring (12) is pocompressed position (12) in a sitioned above the upper sleeve (8) to drive the upper sleeve (6) forward to engage the lower sleeve (4) in case of any unlikely breakdown in the connecting linkage (9) in which lever (9) fails to hold spring (12) in a compressed position.

BAFFLER—INDEX OF DRAWING

1. Upper segment of steering rod
2 Lower segment of steering rod

3. Cut in steering rod
4. Lower sleeve of steering rod coupling
5. Rivet anchoring sleeve to steering rod lower segment
6. Upper sleeve of steering rod coupling
7. Spline fittings in grooves of (1) and (6) to anchor rotary motion
8. Outside circular groove in upper sleeve (6)
9. Lever controlling fore and aft movement of upper sleeve (6)
10. Anchored fulcrum pin for lever (9)
11. Interlocking notches in sleeves (4 & 6) to lock for normal steering
12. Mating notches in sleeves (4 & 6) to lock for normal steering
13. Safety to support locking of sleeves (4 & 6) 13. Threaded shaft with side flanges to mate with grooves in supports
14. Supports with grooves to mate with flanges in threaded shaft (13)
15. Pin linking lever (9) to threaded shaft (13)
16. Cogs on edge of threaded shaft (13) to mate with worm gear
17. Worm gear to mat with cogs of threaded shaft (13)
18. Bi-directional electric motor driving worm gear (17)
19. Ignition key core
20. Electrical connection for "off" position of ignition key
21. Electrical connection for "on" position of ignition key
22. Electrical conductor for "off" position of ignition key
23. Electrical conductor for "on" position of ignition key
24. Breaker switch for conductor (22)
25. Breaker switch for conductor (23)
26. Prong on threaded shaft (13) to activate breaker switches (24 & 25)
27. Ground for electrical circuits

What is claimed is:

1. A device located in the steering column enclosure and controlled by an ignition key, thus making said device indiscernible and tamper proof without dismantling said steering column enclosure;

an ignition key;

a steering rod cut into two segments;

a pair of notched interlocking cylindrical sleeves of which one is fitted on each segment of said steering rod;

a notched interlocking sleeve securely attached to the lower segment of said steering rod, extending beyond the upper end of said lower segment of the steering rod segment and above the lower end of the upper steering rod segment to cradle the lower end of said upper segment of said steering rod;

a mated notched interlocking sleeve with an exterior circular groove and attached to the upper segment of said steering rod by metal splines permitting fore and aft motion of said collar while restricting circular motion relative to said upper segment of said steering rod;

a bi-directional electric motor with a worm gear fitted on said electric motor axis;

a mechanical linkage driven by said bi-directional electric motor through said worm gear and connected to the upper sleeve on said upper segment of the steering rod causing said upper sleeve to move fore and aft to engage or disengage mating notches of the lower sleeve to make the automobile steer normally or alternately render the automobile non-steerable;

a pair of insulated electric wires connecting two points on the ignition key core case to two points in the bi-directional electric motor to energize said bi-directional electric motor to turn on one direction or in the opposite direction in response to the turning of said ignition key;

an energized electrical contact located on the ignition key core in such a way that said contact will energize one or the other of contacts on the ignition key core case when the ignition key is turned to the "on" or "off" position;

a breaker switch in each of said electric wires leading from the ignition key core case to the bi-directional electric motor to shut off the current when the mechanical linkage reaches predetermined points;

a third electric wire is the ground for said electric motor;

a compressed safety spring positioned on the upper steering rod segment to force the upper sleeve to interlock with the lower sleeve in the event of linkage failure.

* * * * *